Jan. 5, 1971  R. L. CORBIN ET AL  3,553,020
SPILL-PROOF BATTERY
Filed Dec. 20, 1968
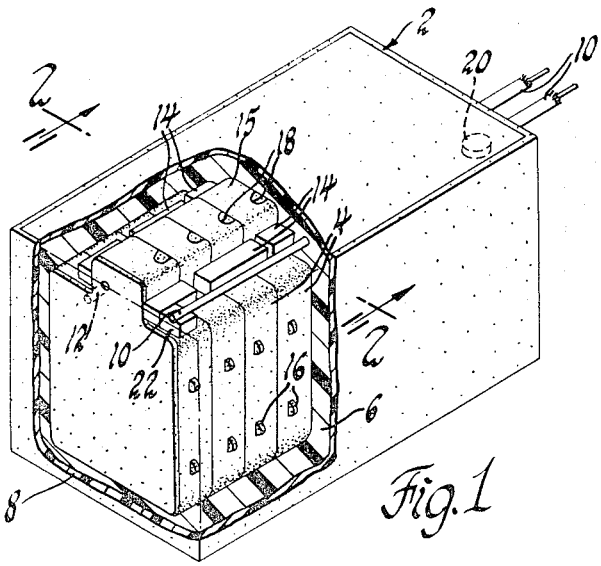
Fig. 1
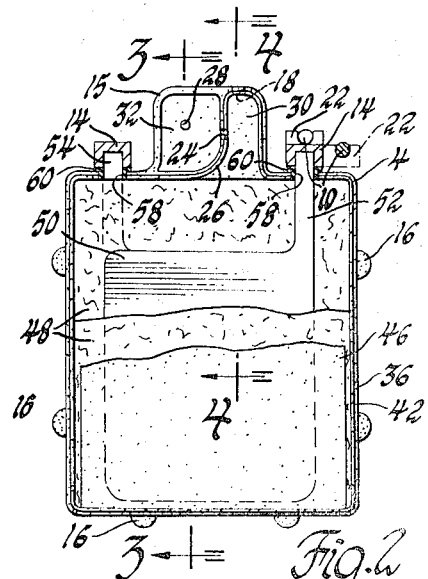
Fig. 2
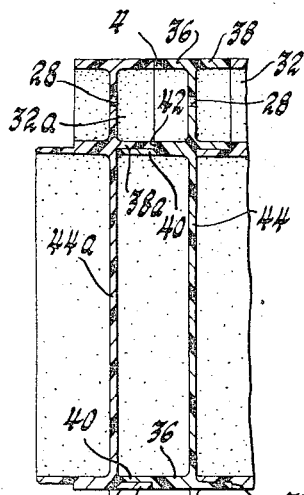
Fig. 3
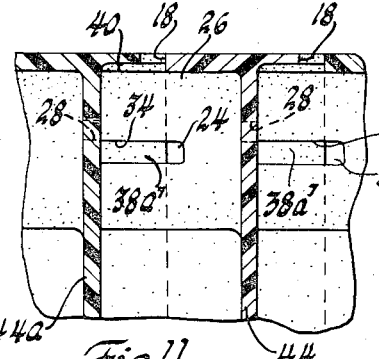
Fig. 4
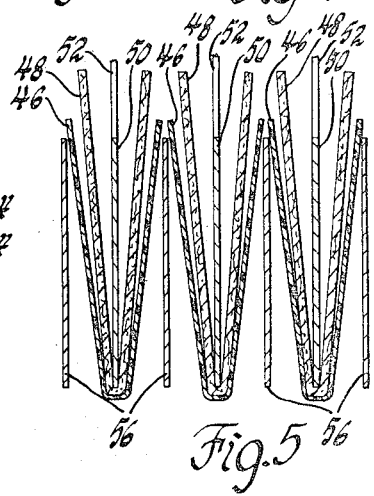
Fig. 5
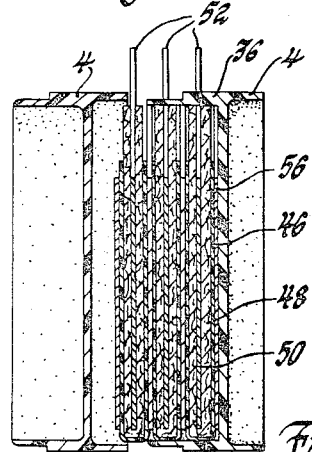
Fig. 6  Fig. 7
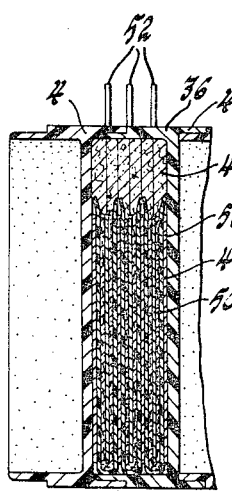
Fig. 8
INVENTORS
Ralph L. Corbin, &
BY Richard A. Jones
Lawrence B. Plant
ATTORNEY

United States Patent Office 3,553,020
Patented Jan. 5, 1971

3,553,020
SPILL-PROOF BATTERY
Ralph L. Corbin and Richard A. Jones, Anderson, Ind., assignors to General Motors Corporation, Detroit, Mich., a corporation of Delaware
Filed Dec. 20, 1968, Ser. No. 785,524
Int. Cl. H01m 35/04
U.S. Cl. 136—6     9 Claims

ABSTRACT OF THE DISCLOSURE

A spill-proof storage battery including a unitized assembly of serially-arranged, nested, cell containers, each container having cell groups compressed therein. The cell groups including positive and negative plates and a separator between the plates, which separator has discrete layers of porous materials coacting to immobilize the battery's electrolyte and prevent internal shorting between the plates.

---

This invention relates primarily to rechargeable, spill-proof, shock and vibration resistant, substantially maintenance-free batteries that can operate in a variety of orientations and environments. Applications such as battery-operated appliances, tools, lights and a variety of other commercial and military electrical equipment require rechargeable, portable power supplies which are not susceptible to electrolyte loss during use as a result of tipping, vibration, etc. or water loss resulting from overcharging. Conventional lead-acid storage batteries have not found widespread use in such applications since they are not adequately sealed against acid leakage and normally require periodic maintenance such as the addition of water. With this invention, a variety of electrochemical cell systems, and especially the lead-acid system, can be adapted to meet the requirements of the aforesaid applications, as well as others. Further, batteries of this invention can be made efficiently and economically by utilizing the specific nested cell container concept of assembly hereinafter described.

It is accordingly an object of this invention to provide a significantly improved battery assembly and a method of manufacturing that assembly including singly and in combination a specific cell containerization concept for isolating the battery's individual cell groups, one from the other, an integral liquid-impassable, venting manifold and a compressed cell group including electrode plates enfolded in separators formed by discrete layers of porous materials which coact to immobilize the battery's electrolyte and prevent internal shorting between the plates.

Other objects and advantages of this invention will become more readily apparent from the detailed description which follows.

FIG. 1 is a partially sectioned, perspective view of a battery assembly made in accordance with this invention.

FIG. 2 is a front elevational view of an individual cell container taken in the direction 2—2 of FIG. 1.

FIG. 3 is a sectioned, side elevational view of a cell container taken in the direction 3—3 of FIG. 2.

FIG. 4 is an enlarged, sectioned, side elevational view taken in the direction 4—4 of FIG. 2.

FIG. 5 is an exploded, sectioned, side elevational view of a preferred arrangement of plates and separators in accordance with another aspect of this invention.

FIG. 6 is a sectioned, side elevational view of two adjacent cell containers having an uncompressed cell group positioned in one of the containers prior to final assembly.

FIG. 7 is a sectional, side elevational view of two adjacent cell containers fully assembled and having a compressed cell group therein.

FIG. 8 is an enlarged, partially sectional, perspective view of the assembly shown in FIG. 7.

This invention comprehends new concepts in battery design and fabrication including bi-flanged, discrete cell containers aligned and nested to form a unitized battery assembly having an integral liquid-impassable venting manifold. The several discrete containers additionally act as closure means for adjacent cell containers. The discrete cell containers comprise a web and two oppositely extending flanges on the periphery of the web. One of the flanges defines a cavity for receiving a cell group. One of the flanges has a reduced thickness portion on its extremities which is adapted to engage a complementary portion on a flange on the next adjacent cell. An integral, multi-baffled, venting manifold and a reflux chamber in each container virtually precludes the passage of liquid out of the cell. Also featured and contributing significantly to the effectiveness of the battery is the use of compressed cell groups in which positive and negative plates are separated by a dual-layered, electrolyte-immobilizing separator comprising a thin, microporous, ion-permeable sheet to prevent metallic conduction between the plates and a porous electrolyte-absorbent mat for immobilizing the electrolyte. Compression of the cell groups in each cell reduces shedding of the active materials, shortens the electrolytic conduction path through the electrolyte and between the electrodes, reduces the loads bearing on the plate grids which, in turn, sustains the grids' structural and electrical integrity, and provides a vibration and shock-resistant assembly. Manufacture of these batteries by automated assembly techniques is readily accomplished by enfolding appropriate electrodes in the separator means prior to placement in the cell container. Compression of the cell groups and alignment of the several containers is accomplished, in a single operation, at the time of closing and sealing the cell containers. Though applicable to several electrochemical systems, such as nickel-zinc, sliver-zinc, and nickel-cadmium, this invention is particularly advantageous to the lead-acid system which, for many years, has been plagued with electrolyte leakage and shock-vibration sensitivity problems.

FIG. 1 shows a battery 2 comprised of an assembly of a number of discrete cell containers 4 housed within a thin plastic shell 8. Each container 4 contains an individual cell group such as will be hereinafter described. The assembled cell containers 4 are spaced from the walls of the shell 8 by means of tabs 16. A potting compound 6 fills the shell 8 and completely engulfs the assembly. Potting compounds including thermosetting resins such as bisphenol-epichlorohydrin (epoxy) or polyesters, or thermoplastic resins (hot melt) such as the polyolefins or the high molecular weight petroleum products are satisfactory. Conductive straps 14 join like plates in each cell group and, at the same time, act as the inter-cell connectors between adjacent cells. The respective straps are most conveniently formed by first casting two continuous strips which extend the full length of the assembled cells. These straps are then cut as required to provide the desired electrical divisions between the several cells. Saddle contacts 22 are formed on the straps 14 and act as seats for the conductors 10. The individual cell containers 4 are filled with electrolyte by injecting the electrolyte into the several cells through injection ports 18 provided in the top of each container 4. After filling, the several ports 18 are sealed with a suitable material such as epoxy or a hot melt material such as polyethylene. After assembly, filling, and potting, a vent 12 is drilled through the shell 8, potting 6 and into the end of the venting manifold 15. In a preferred form, a Zener diode 20 is imbedded in the potting 6 and connected between the conductors 10 in parallel with the battery. The Zener diode 20 prevents overcharge gassing of the battery thereby eliminating the need for special battery charging equipment. Other battery charger components such as diodes, SCR's and transformers could also conveniently be included in the potting 6 especially in the space provided between the manifold 15 and the shell 8.

FIGS. 2, 3 and 4 more clearly show one of the preferred discrete cell containers. FIG. 2 shows a typical cell group in a cavity of the container 4 which is formed by the flange 36. The flange 36 is best shown in FIG. 3. Another flange 38 extends in the opposite direction from the flange 36 and away from the web 44. The web 44 of the cell container 4 forms one of the walls of the cavity in which the cell group is placed. When fully assembled, the web 44a of the next adjacent cell forms the closure means for the cavity. One of the flanges, e.g., 36, has a reduced thickness portion 40 on its outer extremities. A shoulder 42 is formed at the juncture between the reduced thickness portion and the rest of the flange. The reduced thickness portion 40 and shoulder 42 are adapted to complementarily mate, in a nesting manner, with the flange 38a of the next adjacent cell. The two mutually complementing flanges 36 and 38 facilitate greatly the automation of the assembly process by providing several discrete cell containers with a natural self-aligning capability during nesting. This is especially useful during final assembly when the cell groups are being compressed. Absent this self-aligning capability during the final stages of compression, a high reject rate for the assembled batteries is expected due to misalignment at this critical point in the assembly operation. The shoulder 42 serves a dual function. During assembly the leading edge of the flange 38 is contacted with a solvent (e.g., zylene) as by pressing the edge onto a pad saturated with the solvent. The flanges are immediately joined and a solvent seal results between the shoulder 42 and the leading edge of the mating flange. This particular technique is preferred when the composition of the cell container comprises high-impact styrene or similarly solvent-sealable plastics. However, when polyolefin plastics are used to form the containers, a heat seal is preferred. The shoulder 42 also acts as a stop to insure that each cell has substantially the same volume and accordingly each cell group substantially the same degree of compression, as will be discussed hereinafter.

Referring again to FIG. 2, the flanges 36 and 38 have slots 58 formed therein to permit the positive and negative plate lugs 52 and 54, respectively, to project out of the cell container 4. After assembly of the container 4 and casting of straps 14 the slots are sealed with epoxy or hot melt materials 60. After sealing the straps 14 are appropriately cut to provide the necessary intercell connections.

A liquid-impassable, venting configuration is formed as an integral part of each cell container 4 and is comprised basically of a first chamber 30, a second chamber 32, a baffle 26 which divides the two chambers and an aperture 24 in the baffle 26 for communicating the two chambers. A vent port 28 is provided in that portion of the web 44 which forms a wall of the second chamber 32. As best seen in FIG. 3, the vent port 28 opens into the second chamber 32a of the next adjacent cell, which pattern is repeated throughout the full length of the battery assembly such that the several chambers 32 form a multi-baffled manifold which is ultimately vented to the atmosphere through the vent port 12 (FIG. 1). Chamber 30 comprises part of the liquid-impassable venting concept and acts as an electrolyte separator. This chamber initially removes a good share of any electrolyte entrained in the battery gasses during charging and refluxes it to the cavity. The gasses pass through the aperture 24 into the chamber 32. Any electrolyte which might still remain in these gasses is further separated and condensed in chamber 32 and can be returned to the cell cavity by tipping the battery such that it runs back through the aperture 24. For this reason, it is preferred to have the aperture 24 located somewhat below the vent port 28. The combination of the refluxing action of the chamber 30, the action of the baffle 26, and the tortuous manifolding system formed by the several aligned chambers 32 virtually eliminates liquid passage out of the assembly. Electrolyte retention is also insured by the electrolyte immobilization technique to be hereinafter discussed.

FIG. 4 emphasizes a most convenient way for providing the aperture 24 in the baffle 26. A slot 34 is provided in the baffle 26 at the time the cell container 4 is formed (e.g., molded). After assembly, the mating flange 38a' on the next adjacent cell partially closes off the slot 34 leaving only the aperture 24 between the chambers 30 and 32. This technique greatly simplifies the formation of the aperture 24 and eliminates the need for a specific punching operation.

FIG. 5 shows a preferred way for forming the cell groups of this invention. In an exploded view, FIG. 5 shows several negative electrodes 56, positive electrodes 50 and separators arranged between the several electrodes. The separators comprise two distinct layers of porous materials. One of the layers 46 comprises a thin, microporous, ion-permeable sheet comprised of a material such as polyethylene polyvinyl-chloride, or the like. The purpose of this sheet is to permit electrolytic conduction between the electrodes while at the same time preventing metallic conduction therebetween as a result of "treating." In many respects, then, the microporous sheet 46 is closely akin to conventional separators used in lead-acid storage batteries. The sheet 46 need not be more than about 8 to 10 mils thick and has a nominal pore size of about 0.15 micron diameter. This pore size is considerably smaller than that of conventional lead-acid separators and significantly so since it provides excellent protection against infiltration by small particles and electrical shorting between the closely spaced plates. These extremely small pores in the sheet can be tolerated without introducing an unacceptable IR drop in the battery since the compression technique, to be hereinafter described, provides a closer and quite uniform spacing of the electrodes which effectively overcomes any resistance loss in the system which might otherwise result from the use of such small pores. The other porous layer 48 comprises a "lofty," nonwoven, fabric mat. Mats comprising polypropylene or copolymers of vinyl chloride and acrylonitrile sold commercially under the trademark Dynel have proved satisfactory. During the assembly of the cell group, but prior to the group compression into the cell cavity, a Dynel fabric of the type described is preferably approximately 0.09 inch thick per layer and has an apparent density of about .00086 gram per square inch per mil of thickness. This corresponds to a porosity of about 96% in the uncompressed state. In the compressed state, between the electrodes the mat is about 88% porous. The mat is highly absorbent and can hold about 20 to 25 times its own weight in terms of electrolyte (i.e., 35% $H_2SO_4$). As best shown in FIG. 2, the acid-immobilizing mat 48 is sized to extend beyond the edges of the plates and to occupy virtually all the space within the cavity not occupied by the plates 50 and 56 and microporous sheet 46. The composite separator thus described has a nominal electrical resistance of about 0.02 ohm per square inch in the lead-acid system. Movement of the electrolyte through the cell groups and between the plates thereof is accomplished by the wicking action of the mat in combination with the circulation resulting from the specific gravity changes of the electrolyte during cycling.

As best shown in FIG. 5, one of the electrodes, preferably the positive plate 50, is enfolded within the separator means. The electrolyte absorbent mat 48 is immediately adjacent the positive plate 50 while the microporous sheet 46 enfolds both the mat and the plate 50. The thus enfolded positive plate is positioned between two negative plates 56 so that the microporous sheet 46 is immediately adjacent the negative plate 56. This arrangement is preferred since the tree-inhibiting sheet 46 is most effective when in direct contact with the "treeable" negative electrodes 56 and the electrolyte is more in direct contact with the positive electrodes 50. For ease of manufacture, the V fold technique is preferred. Other techniques for encapsulating the plates have been used successfully. Such other techniques include, for example, forming a laminate of the several materials with the composite separator means overhanging the plates and then heat sealing the overhanging portions to form an envelope. The highly porous and absorbent mat 48 immobilizes and retains electrolyte in quantities which permit attainment of stoichiometrically desirable electrolyte-to-active materials ratios without sacrificing valuable space within the cavity. The tree-inhibiting, microporous sheet permits the use of such highly porous mats. Others have attempted to use less porous mats without a microporous separator (e.g., about 80%) toward the end that the solids content (20%) of the mat in combination with comparatively larger spacing between electrodes would perform the anti-treeing function. While operative batteries were producible, the necessity for the higher solids content necessitated either the loss of valuable electrolyte capacity which was needed to meet the stoichiometric requirements of the cell or a lower ceiling on the amount of active materials which could be used in each cell. Our battery suffers from neither of these deficiencies.

As best shown in FIGS. 6 and 7, cell groups are stacked into the cavities formed by cell container's flange 36. The thickness of these cell groups, in a direction normal to the plates, when initially placed in the cell cavity is greater than the thickness of the cavity itself. During the initial phase of assembling the several containers 4 into the unitized assembly forming the battery, the extremities of the complementary flanges begin to engage one another, loosely at first, before there is any substantial compression on the cell group. This initial engagement facilitates alignment of the several containers and the cell groups within each container. The final seating of the flanges and compression of the groups is now readily accomplished with a low incidence of rejects due to misalignment less sophisticated production equipment can also be used without compromising the reject rate.

When the complementary flanges are fully seated, joined and sealed, the cell group is under compression as best shown in FIGS. 7 and 8. The most yieldable member of the group is the absorbent mat 48. The positive plates 50, negative plates 56, and microporous sheet 46 tend to substantially retain their original thickness even though now under compression. The mat 48, being resilient, holds the several components of the cell group in a tight, biased relation one to the other.

This biased relation resulting from compression of the resilient mat 48 enhances lifetime grid integrity, both structurally and electrically and provides an extremely tight, vibration and shock-resistant assembly. Compression of the resilient mat additionally reduces the tendency for the plates to shed and facilitates the establishment and maintenance of substantially uniform, though close, electrode spacing. As a result of the group compression, the comparatively noncompressed portions of the nonwoven mat (i.e., not between the plates) are caused to virtually fill all the void spaces remaining in the cavity as best shown in FIG. 8.

After the several groups and cell containers have been assembled into the battery, but before potting, electrolyte is introduced through injection ports 18. This is simply accomplished by use of a bank of injectors adapted for positive displacement of the electrolyte. The electrolyte concentration is selected for a single step formation and is selected such that after formation of the plates the electrolyte will still be at a desirable operating level of about 1.25–1.31 specific gravity for $H_2SO_4$ in the lead-acid systems. High purity sulfuric acid having a specific gravity of about 1.24 is presently preferred as the filling acid with the view in mind of forming the plates until the specific gravity of the $H_2SO_4$ is about 1.29. Batteries of this type may also be made using dry-charge plates, which do not require in-the-cell formation. In this case, filling acid concentrations are adjusted to those typical for activating conventional dry-charge batteries.

The plates that are usable with this battery system are more or less conventional but, of course, their chemical composition will vary with the particular electrochemical system or galvanic couple chosen. In the case of the lead-acid system, the plates contain a lead or lead-alloy grid. Since it is desirable to have a virtually sealed battery, it is preferred to use either pure lead or a lead-calcium alloy in forming the grid. This eliminates antimony from the system. By eliminating antimony, the batteries evolve less gas during charge and have a lesser tendency for self discharge. This greatly reduces water consumption and enhances shelf-life. Lead alloy grids having about 0.04 to 0.09% calcium are preferred. Composite grids containing plastic supports with conductors thereon can also conveniently be used.

Though both larger and smaller batteries are possible, a particular battery made in accordance with the teachings of this invention is about 3.5 inches long, 2 inches wide and 3 inches high. The positive and negative grids are comprised of lead-calcium alloy and are about 1.70 inches high and 1.50 inches wide. The cell group comprises four negative and three positive plates pasted to a thickness of about 0.04 inch, a mat which is about 0.09 inch thick in the uncompressed state and a microporous separator which is about .01 inch thick. The total cell group, prior to compression, has a thickness of about 0.88 inch which, after compression and sealing of the several cell containers, is reduced to about 0.50 inch. This corresponds to a compressed mat condition of about 0.03 inch. When compressed, the porous mat virtually fills the cell gravity. The mat laterally overhangs the several plates in each group by about 0.40 inch while, in the vertical direction, it overhangs the several plates by about 0.60 inch, and this being principally above the cell group. This additional space provides room for the extra electrolyte required to maintain the stoichiometrically desirable electrolyte-to-active materials ratios. The several discrete cell containers are comprised of high impact styrene and have an overall width of about 2 inches and height, including the manifold venting means, of about 3 inches. The manifold venting means comprises about 0.50 inch of the total height. The first flange extends about 0.50 inch from the web and is the principal cavity-forming flange. The second flange extends about 0.260 inch from the web. The web itself is about 0.05 inch thick.

While we have disclosed our invention primarily in terms of a specific embodiment thereof, we do not intend to be limited thereto except to the extent hereinafter defined.

We claim:

1. A spill-proof storage battery comprising at least two aligned, nested, discrete cell containers, at least one cell group in each container, electrolyte in each container, and means for electrically connecting the cell group in one container to the cell group in another container, wherein each of said containers comprises a web and first and second flanges on the periphery of said web, said flanges extending in opposite directions one from the other, said first flange and web defining a cavity for receiving one of said groups and said electrolyte, said first flange further defining a liquid-impassable venting means for said cavity, a baffle dividing said venting means into first and second chambers, an aperture in said baffle to communicate said first and second chambers, the first of said chambers communicating with said cavity, the second of said chambers having a gas port therein for venting said second chamber, a reduced thickness portion on the extremities of one of said flanges to provide a guide for the other flange on the next adjacent container during assembly of the battery, a shoulder on said one flange, the other of said flanges on the next adjacent container in said battery nesting with said one flange and sealingly engaging said shoulder whereby the web of said adjacent container forms a closure for said cavity, and wherein said cell group comprises at least one negative electrode, at least one positive electrode and a composite, electrolyte-immobilizing separator means between said electrodes, said separator means having first and second layers of porous materials, said first layer comprising a thin microporous ion-permeable sheet to prevent metallic conduction between said electrodes while freely permitting electrolytic conduction therethrough, said second layer comprising an electrolyte-absorbent mat having a porosity of at least about 88% and an electrolyte retaining capacity of at least about twenty-times its own weight to immobilize said electrolyte without substantially compromising efficient electrolyte-to-active materials stoichiometric utilization ratios.

2. A storage battery including electrically interconnected cell groups, and a number of aligned, nested, discrete cell containers for isolating said groups electrochemically one from the other, each of said containers comprising a web and first and second flanges on the periphery of said web, said flanges extending in opposite directions one from the other, said first flange and web defining a cavity for receiving one of said groups, said first flange further defining a liquid-impassable venting means for said cavity, a baffle dividing said venting means into first and second chambers, an aperture in said baffle to communicate said first and second chambers, the first of said chambers communicating with said cavity, the second of said chambers having a gas port therein for venting said second chamber, a reduced thickness portion on the extremities of said first flange to provide a guide for the second flange on the next adjacent container during assembly of the battery, and a shoulder on said first flange abutting the leading edge of the second flange on the next adjacent container, the several containers being nested one within the other such that the web of said adjacent container forms the closure for said cavity.

3. The battery as claimed in claim 2 wherein said gas port for venting said second chamber is in said web and opens into the corresponding second chamber of the next adjacent container, said second chambers being aligned and acting in concert to form a multi-baffled, liquid-impassable venting manifold for the several cells of said battery, said manifold being vented to the atmosphere.

4. A storage battery comprising a stack of at least two aligned, nested, discrete, cell containers, at least one cell group in each of said containers, means electrically interconnecting said cell groups one with the other, each of said containers comprising a web and first and second flanges on the periphery of said web, and said flanges extending in opposite directions one from the other, said first flange and web defining a cell cavity, said first flange further defining a vent chamber, a baffle between said cell cavity and said vent chamber, an aperture in said baffle communicating said cell cavity with said vent chamber, a reduced thickness portion on the extremity of said first flange providing a guide for the second flange on the next adjacent container during assembly of the battery stack, a shoulder on said first flange abutting the leading edge of the second flange on the next adjacent container, said containers being nested one with the other such that the web of said adjacent container forms the closure for said cell cavity.

5. The battery as claimed in claim 4 wherein said means for electrically inter-connecting the said cell groups is a segment of an initially continuous conductor.

6. A storage battery comprising a stack of at least two aligned, nested, discrete, cell containers, at least one cell group in each container, means electrically interconnecting said groups one with the other, each of said containers comprising a web and first and second flanges on the periphery of said web, said flanges extending in opposite directions one from the other said first flange and said web defining a vented cell cavity, a reduced thickness portion on the extremities of said first flange providing a guide for the second flange on the next adjacent container during assembly of the battery stack, a shoulder on said first flange abutting the leading edge of the second flange on the next adjacent container, said cell group comprising at least one positive plate, at least one negative plate and an electrolyte-immobilizing, tree-growth-suppressing composite separator means significantly compressed between said plates, said composite separator including a thin microporous sheet and a bibulous electrolyte-absorbent mat, portions of said mat overhanging said plates and substantially filling said cavity, said cell containers being nested one within the other such that the web of said adjacent container forms the closure for said cell cavity.

7. A lead-acid storage battery comprising a stack of at least two aligned, nested, discrete cell containers, at least one cell group in each container, said cell group comprising at least one positive plate, and at least one negative plate and an elecrolyte-immobilizing, tree-growth-suppressing composite separator means significantly compressed between said plates, said composite separator comprising a microporous polymeric sheet having a thickness of less than about 10 mils and a nominal pore size of about 0.15 micron in diameter, and a bibulous acid-absorbent polymeric mat having a porosity of at least about 88% and an acid retaining capacity of at least about twenty times its own weight, portions of said mat overhanging said plates and substantially filling said cavity, means electrically interconnecting said groups one with the other, said containers each comprising a web and first and second flanges on the periphery of said web, said flanges extending in opposite directions, one from the other, said first flange and said web defining a vented cell cavity, a reduced thickness portion on the extremities of said first flange providing a guide for the second flange on the next adjacent container during assembly of the battery, a shoulder on said first flange abutting the leading edge of the second flange on the next adjacent container, and said containers being nested one within the other such that the web of said adjacent container forms the closure for said cell cavity.

8. A storage battery comprising a stack of at least two aligned, nested, discrete, tray-like, cell containers, at least one cell group in each container, each of said cell groups including absorbent means for substantially immobilizing said battery electrolyte in the cell container, means for electrically interconnecting said groups one with the other, each of said containers comprising a web and first and second flanges on the periphery of said web, said flanges extending in opposite directions one from the other, said first flange and said web defining a first cell cavity and a first vent chamber, a first baffle separating said first cavity from said vent chamber, an aperture in said first baffle communicating said cell cavity with said first vent chamber, said second flange and said web defining a second cell cavity and a second vent chamber, a second baffle separating said second cell cavity from said second vent chamber, an aperture in said web communicating said first vent chamber with said second vent chamber, said containers being nested one within the other such that the web of one container forms the closure for the cell cavity of the next adjacent container, said vent chambers being in alignment and together forming a liquid impassable venting manifold for said battery stack, said manifold being vented to the atmosphere.

9. A lead-acid storage battery comprising a stack of at least two aligned, nested, discrete cell containers, each of said containers comprising a web and at least one flange on the periphery of said web defining a cell cavity, a tortuous-pathed venting manifold, means for venting said cell cavity into said manifold, at least one cell group in each container, said cell group including at least one positive plate, at least one negative plate and an acid-immobilizing, tree-growth-suppressing composite separator compressed between said plates, said separator comprising a thin microporous sheet for suppressing tree growth between said plates and a bibulous acid-absorbent mat having a porosity of at least about 88% and an acid retaining capacity of at least about twenty times its own weight, a portion of said mat between said plates being compressed to at least about one-third its uncompressed thickness and a second portion of said mat overhanging said plates and substantially filling said cavity to capillarily immobilize any acid in said cavity which is not absorbed in said group, and means electrically interconnecting said cell group one with the other.

References Cited

UNITED STATES PATENTS

| | | | |
|---|---|---|---|
| 1,712,897 | 5/1929 | Morrison | 136—12 |
| 2,851,509 | 9/1958 | Di Pasquale et al. | 136—6 |
| 3,207,630 | 9/1965 | Solomon et al. | 136—83 |
| 3,333,986 | 8/1967 | Chreitzberg et al. | 136—6 |
| 3,425,871 | 2/1969 | Berger | 136—83 |
| 3,441,447 | 4/1969 | Hartop | 136—166 |
| 3,463,672 | 8/1969 | Schmidt | 136—166 |

WINSTON A. DOUGLAS, Primary Examiner

C. F. LeFEVOUR, Assistant Examiner

U.S. Cl. X.R.

136—166